May 1, 1923.
P. A. HIRSCH
1,453,977
METHOD OF TREATING AND FEEDING FUEL AND APPARATUS THEREFOR
Filed April 22, 1921
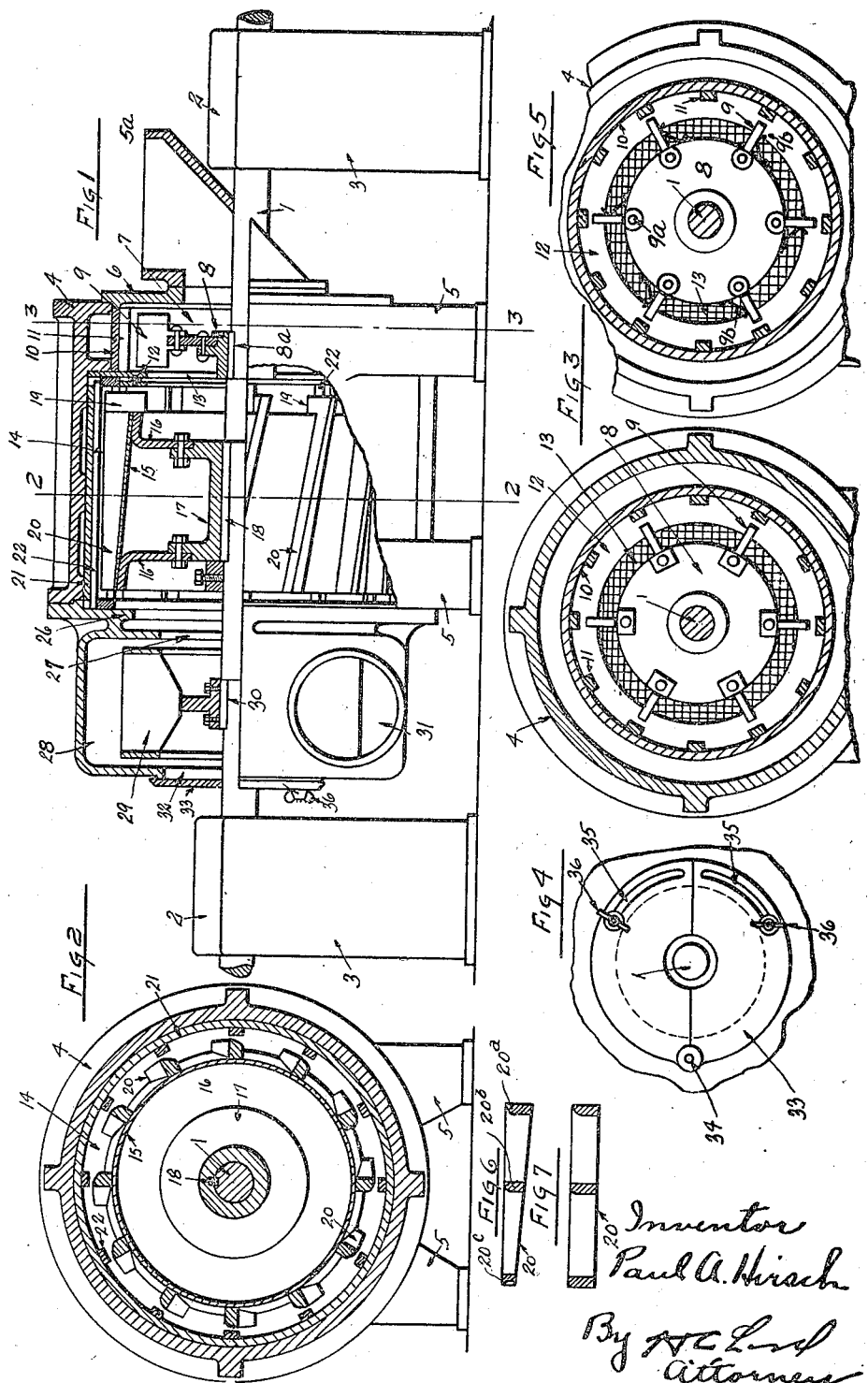

Patented May 1, 1923.

1,453,977

UNITED STATES PATENT OFFICE.

PAUL A. HIRSCH, OF ERIE, PENNSYLVANIA, ASSIGNOR TO AERO PULVERIZER COMPANY, OF NEW YORK, N. Y., A CORPORATION OF DELAWARE.

METHOD OF TREATING AND FEEDING FUEL AND APPARATUS THEREFOR.

Application filed April 22, 1921. Serial No. 463,625.

*To all whom it may concern:*

Be it known that I, PAUL A. HIRSCH, a subject of the King of Great Britain, residing at Erie, in the county of Erie and State of Pennsylvania, have invented new and useful Improvements in the Methods of Treating and Feeding Fuel and Apparatus Therefor, of which the following is a specification.

This method and apparatus forming the subject matter of this invention is designed to pulverize coal or analogous fuel and immediately feed it for combustion. One of the principal problems involved is to accomplish the treatment of the fuel with an expenditure of power which will be more than compensated by the more perfect combustion as the fuel is burned.

In carrying out the invention the coal is first crushed into comparatively small particles and then pulverized. Air is utilized in carrying the material through the crusher and pulverizer and this air supplemented by other air is used for supporting combustion. I have found that the material may be driven through the pulverizer with a comparatively high-pressure fan of small capacity utilizing a low pressure fan of large capacity to supplement the air that is driven through the pulverizer for supporting combustion. This plan of operation results in great economy in power consumption.

In carrying out the invention I preferably utilize a driving fan and in addition thereto inclined beaters so as to impel the air and material in a forward direction, thus increasing the movement of air and fuel. I also find it advantageous to restrict the air flow to an annular space adjacent to the attrition surface, thus reducing the amount of air that is necessary to be moved. I further find it desirable to make this annular passage more restricted at the outlet than the inlet in that the material as it becomes finer may be kept in more intimate relation with the attrition surface. This results in an acceleration of air and material through the passage so that the material as delivered from the pulverizer has a velocity approximating that with which it is impelled in carrying it to the point of combustion. This arrangement reduces the power necessary to feed the fuel and air to the point of combustion to a very large degree. It will be understood that as a rule there is a supplemental air and impelling device, such as a fan, for moving the material after it leaves the pulverizer and with the pulverizer arranged to induce a flow to the fan rather than increase its load the total load in the machine is, as before stated, reduced. Other details and objects of the invention will appear from the specification.

The apparatus forming the subject of the invention and by which the method may be practiced is illustrated as follows:—

Fig. 1 shows a front elevation, partly in section, of the apparatus.

Fig. 2 shows a section on the line 2—2 in Fig. 1.

Fig. 3 a section on the line 3—3 in Fig. 1 involving an alternative construction.

Fig. 4 an end view showing the inlet valve for supplemental air.

Fig. 5 a section on the line 3—3 in Fig. 1.

Fig. 6 an elevation of one of the beater blades showing a cross section thereof at different points.

Fig. 7 an alternative construction of beater blades.

1 marks the shaft on which the rotating members of the apparatus are mounted. This shaft is journaled in boxes 2—2 carried by the posts 3. The crushing and pulverizing members are arranged within a stationary drum 4 which is mounted on the posts 5. Material is fed to the drum through a chute $5^a$ which enters through an opening in the head 6. The crushing chamber 7 has the beater made up of the carrier 8 and beater blades 9. The carrier is locked on the shaft by means of a key $8^a$. The beater blades operate through an attrition surface 10 on which are arranged a series of stationary blades 11. An annular flange 12 extends inwardly at the outlet side of the chamber 7 so that the crusher blades operate to some extent in what may be termed a dead space so far as air movement is concerned. Thus the material before it is carried to the outlet is retained by centrifugal force in the outer pocket formed in the chamber 7 until sufficiently broken up to pass through the outlet.

The blades 9 are preferably pivotally mounted on the carrier by means of pins 9ª and tend to assume their radial position through centrifugal force. This may be supplemented, if desired, by the springs 9ᵇ. By thus yieldingly mounting the blades they will not be destroyed when material which cannot be crushed is accidentally carried in with the fuel.

The movement of fuel from the crusher chamber is obstructed both by the inwardly extending flange 12 and by a screen 13, this screen having a three-eighths to one-half inch mesh. The flange prevents the fuel entering the pulverizer before it has a preliminary crushing and the screen prevents the entrance of any foreign material which would injure the pulverizer.

The pulverizer is arranged in a chamber 14 leading from the crusher chamber. A drum 15 is mounted on a carrier formed with the flanges 16 and hub 17, the hub being locked to the shaft 1 by means of a key 18. Fan blades 19 are arranged at the inlet end of the drum, the drum at this end being slightly off-set from the end of the chamber. The material coming in from the crusher chamber is thrown outwardly by centrifugal force. The air is also put in motion by these blades which not only tend to move the material outwardly but to carry it along axially. The beater blades 20 are mounted on the drum and operate in connection with an attrition surface 21 on the inner wall of the drum 4. Blades 22 extend axially along the surface 21 and operate in conjunction with the beater blades in pulverizing the fuel.

The drum with its carrier confines the movement of air and material to a restricted annular passage adjacent to the attrition surface. Thus the material is kept in constant position to be operated upon and there is no loss of power from a movement of the material away from this zone. The beater blades 20 are preferably arranged on a spiral so as to operate as turbines in producing air flow and by their inclination to give to the material through impact a forward movement. The annular passage between the drum and the attrition surface is preferably more restricted at the outlet than the inlet and this is accomplished preferably by making the drum slightly conical and of larger diameter at the outlet end.

As the material enters it is taken up by the combined fan and beater blades 19 and thrown outwardly into the entrance of the annular passage between the drum and attrition surface. Here the material is given a radial and circumferential movement by the action of the beater blades and is not only carried forward by the air which is forced by the fan 19 but a forward movement of both air and material is effected by the inclination of the blades. I have shown the stationary blades as parallel to the axis but it will readily be observed that if the movable and stationary blades operating in conjunction are inclined the material may be carried forward not only by air current but by the inclination of the blades.

As the material progresses in the pulverizing action the influence of centrifugal force becomes reduced and the most efficient method of operating upon the material changes. I prefer, therefore, to form the outer edge of the blades at the inlet end slightly beveled and rounded on the advance face as shown at 20ª in Figure 6, gradually decreasing this beveled and rounding surface as indicated at 20ᵇ and reversing the inclination and bevel at the outlet so that at the outlet the edge of the blade is comparatively sharp as shown at 20ᶜ. This formation of blade operates on the material in its different degrees of fineness with the greatest efficiency.

In Fig. 7 a blade 20ª similar to the blade 20 is shown but adapted to a passage of equal restriction throughout.

The material as it is delivered from the pulverizer is carried toward the center of the machine by the head 26 and through the outlet passage 27 to a fan chamber 28. A fan 29 is arranged in the chamber 28 and fixed on the shaft 1 by means of a key 30. Air is delivered from the fan chamber through the action of the fan through the outlet passage 31 which carries the material to the point of combustion. The amount of air that should be carried through the pulverizer to accomplish the highest efficiency is not sufficient to support combustion. For this reason additional air is delivered to the fan through an opening 32 which is controlled by a shutter 33. The shutter is formed in halves which are pivoted on a pin 34. Each half has a slot 35 through which a thumb screw 36 projects. By this means the shutter may be adjusted to give the proper opening to admit the air necessary for combustion.

By giving to the air and fuel an initial velocity in the pulverizer the load on the impelling fan is very much reduced. In actual practice the power consumption of the apparatus as a whole is so much below the added power through the more perfect combustion of the fuel over ordinary methods as to make the apparatus as a whole of great advantage. This is accomplished in a very large measure by forming the fan by the blades 19 and beaters 20 of small capacity but at a speed to give a relatively high pressure and providing the added air for combustion by a fan, the blades of which have a slower velocity but larger capacity, as the blades 29. This is accomplished in the present construction by making the blades 19 of less radial extent. In actual practice about one-eighth of the total air would be driven through the pulverizer and would produce a pressure about three times that of the low pressure fan at the outlet. The driving forces should be so gauged that the air and material are delivered to the inlet of the low pressure fan in about the same condition as the air delivered through the opening 32 so that the pulverizer does not form a drag on the impelling fan. This scheme of operation results in a very great reduction in power required to deliver fuel utilizing this general plan.

What I claim as new is:—

1. In an apparatus for treating and feeding fuel, the combination of a crushing chamber; a pulverizing chamber leading from the crushing chamber; a rotary beater in the crushing chamber; a rotary pulverizer in the pulverizing chamber the clearance between the walls of the crusher chamber and the beater being greater than the clearance between the walls of the pulverizer chamber and the rotary pulverizer; and an obstruction between the chambers preventing the passage of larger particles from the crushing chamber to the pulverizing chamber.

2. In an apparatus for treating and feeding fuel, the combination of a crushing chamber having an annular pocket; a pulverizing chamber leading from the crushing chamber; a beater operating in the crushing chamber; said beater operating in said annular pocket neutralizing the driving forward of the air and material; and a rotary beater in the pulverizing chamber, said beater having means for advancing the material and air.

3. In an apparatus for treating and feeding fuel, the combination of a chamber having an annular imperforate attrition surface; axially extending blades on the attrition surface; a rotary beater; abutment blades on the beater, said blades being arranged spirally and adapted to advance the material as it is projected from the blades; and means for advancing the pulverized material and air passing through the pulverizer towards the point of combustion.

4. In an apparatus for treating and feeding fuel, the combination of a chamber having an elongated imperforate attrition surface on an imperforate wall free from axial obstructions; a rotary beater operating in connection with said surface, said beater having blades inclined circumferentially to advance the material and air; and means for advancing the pulverized material and air passing through the pulverizer towards the point of combustion.

5. In an apparatus for treating and feeding fuel, the combination of a chamber having an annular attrition surface; a rotary beater operating in connection with said attrition surface; means comprising an annular axially extending wall for confining the material to a restricted space adjacent to the attrition surface, and means for advancing the pulverized material and air towards the point of combustion.

6. In an apparatus for treating and feeding fuel, the combination of a chamber having an annular attrition surface; a rotary beater operating in connection with said attrition surface; means comprising an annular axially extending wall for confining the material to a restricted space adjacent to the attrition surface, said restriction being greater toward the discharge end; and means for advancing the pulverized material and air towards the point of combustion.

7. In an apparatus for treating and feeding fuel, the combination of a chamber having an elongated annular attrition surface; a rotary beater within the attrition surface; means comprising an annular axially extending wall for confining the material to a passage adjacent to the attrition surface, said beater having blades inclined circumferentially to advance the material; and means for advancing the pulverized material and air towards the point of combustion.

8. In an apparatus for treating and feeding fuel, the combination of a chamber having an elongated annular attrition surface unobstructed axially; a rotary beater operating in connection with said attrition surface; means comprising an annular axially extending wall for confining the material to a passage adjacent to said attrition surface; and means for advancing the pulverized material and air towards the point of combustion.

9. In an apparatus for treating and feeding fuel, the combination of a chamber having an elongated annular attrition imperforate surface unobstructed axially; abutment blades arranged on said attrition surface; a rotary beater having spirally arranged blades operating in connection with said attrition surface; means comprising an annular axially extending wall for confining the material adjacent to said attrition surface; and means for advancing the pulverized material and air passing through the pulverizer towards the point of combustion.

10. In an apparatus for treating and feeding fuel, the combination of a chamber having an annular attrition surface; a rotary beater operating in connection with the attrition surface, said beater comprising a drum slightly spaced from the surface confining the material to a narrow passage adjacent to the attrition surface; blades at the inlet end of the drum; and means for advancing the pulverized material and air towards the point of combustion.

11. In an apparatus for treating and feeding fuel, the combination of a chamber having an annular attrition surface; a rotary beater operating in connection with the attrition surface, said beater comprising a drum slightly spaced from the surface confining the material to a narrow passage adjacent to the attrition surface; blades at the inlet end of the drum; blades arranged on the drum; and means for advancing the pulverized material and air towards the point of combustion.

12. In an apparatus for treating and feeding fuel, the combination of a chamber having an annular attrition surface; a rotary beater operating in connection with the attrition surface, said beater comprising a drum slightly spaced from the surface confining the material to a narrow passage adjacent to the attrition surface; blades at the inlet end of the drum; spiral blades arranged on the drum and means for advancing the pulverized material and air towards the point of combustion.

13. In an apparatus for treating and feeding fuel, the combination of a chamber having an elongated annular attrition surface unobstructed axially; blades on said attrition surface; a rotary drum slightly spaced from said surface forming with said attrition surface a confined annular passage; blades on the drum; and means for advancing the pulverized material and air passed through the pulverizer towards the point of combustion.

14. In an apparatus for treating and feeding fuel, the combination of a chamber having an elongated annular attrition surface unobstructed axially; blades on said attrition surface said rotary drum slightly spaced from said surface forming with said attrition surface a confined annular passage; inclined blades on the drums adapted to advance the material; and means for advancing the pulverized material and air passed through the pulverizer towards the point of combustion.

15. In an apparatus for treating and feeding fuel; the combination of a chamber having an annular attrition surface; a rotary drum slightly spaced from the surface forming with the surface a confined passage more restricted at the outlet than the inlet; blades on the drum inclined to advance the material; and means for advancing the pulverized material and air passed through the pulverizer towards the point of combustion.

16. In an apparatus for treating and feeding fuel, the combination of a chamber having an elongated attrition surface; a rotary beater having blades operating in connection with the attrition surface, the blades at the inlet end of the attrition surface being bevelled on the advance side the bevel on the advance side being less toward the outlet; and means for advancing the pulverized material and air towards the point of combustion.

17. In an apparatus for treating and feeding fuel, the combination of a chamber having an elongated attrition surface; a rotary beater operating in connection with the attrition surface, the blades at the inlet end of the attrition surface being bevelled on the advance side and the blades at the outlet end of the attrition surface being under-cut on the advance side; and means for advancing the pulverized material and air towards the point of combustion.

18. In an apparatus for treating and feeding fuel, the combination of a chamber having an attrition surface having axially arranged blades thereon; a rotary beater having blades operating in connection with said attrition surface, the blades being bevelled on the advance side at the inlet end of the attrition surface; and means for advancing the pulverized material and air passed through the pulverizer towards the point of combustion.

19. In an apparatus for treating and feeding fuel, the combination of a chamber having an attrition surface having axially arranged blades thereon; a rotary beater having blades operating in connection with said attrition surface, the blades at the inlet end of the attrition surface being bevelled on the advance side and the blades at the outlet end of the attrition surface being undercut on the advance side; and means for advancing the pulverized material and air passed through the pulverizer towards the point of combustion.

20. In an apparatus for treating and feeding fuel, the combination of a crushing chamber having an annular pocket therein; a rotary beater operating in the pocket; a pulverizing chamber leading from the crushing chamber having an annular attrition surface unobstructed axially; axially arranged blades on the attrition surface; a rotary beater operating in connection with the attrition surface, said beater comprising an annular drum slightly spaced from the surface forming in connection with the attrition surface a restricted annular passage; spirally arranged blades on the drum; fan blades at the inlet end of the drum; a fan chamber leading from the pulverizing chamber; and a fan arranged in the fan chamber.

21. The method of treating and feeding fuel which consists in pulverizing the fuel while confined in a highly restricted narrow annular walled passage, moving it against attrition surfaces and advancing it with the air in an annular and forward direction, and carrying the fuel with the air from said passage toward the point of combustion.

22. The method of treating and feeding fuel which consists in pulverizing the fuel while confined in a highly restricted narrow annular walled passage, creating a rotation and forward movement of material and air through the passage with an accelerating velocity toward the outlet and then advancing the material and said air from the outlet towards the point of combustion.

23. The method of treating and feeding fuel which consists in initially crushing the fuel, then carrying the fuel to a highly restricted narrow annular walled passage in which the fuel is confined and pulverized while so confined by attrition, the fuel being advanced with air through agencies operating in the passage, and then carrying the fuel and said air from the passage towards the point of combustion.

24. The method of treating and feeding fuel which consists in confining the material in a highly restricted narrow annular walled passage, pulverizing it while confined within the passage by attrition and advancing it through the action of air forced into the passage; and advancing the material with the air from the passage towards the point of combustion.

25. In an apparatus for treating and feeding fuel, the combination of a pulverizer comprising a chamber having an attrition surface; beaters operating in connection with said surface; means for delivering air under pressure to act on the material to advance the material through the pulverizer; and mechanism for adding air to the combined air and material coming from the pulverizer and impelling the same towards the point of combustion.

26. In an apparatus for treating and feeding fuel, the combination of a pulverizer comprising a chamber having an attrition surface; beaters operating in connection with said surface; means for delivering air under pressure to act on the material to advance the material through the pulverizer; and mechanism for adding air to the combined air and material coming from the pulverizer and impelling the same towards the point of combustion, said mechanism effecting a lower pressure than the means.

27. In an apparatus for treating and feeding fuel, the combination of a pulverizer comprising a chamber having an attrition surface; beaters operating in connection with said surface; means for delivering air under pressure to act on the material to advance the material through the pulverizer; and mechanism for adding air to the combined air and material coming from the pulverizer and impelling the same towards the point of combustion, said mechanism having a greater capacity than the means.

28. In an apparatus for treating and feeding fuel, the combination of a pulverizer comprising a chamber having an attrition surface; beaters operating in connection with said surface; means for delivering air under pressure to act on the material to advance the material through the pulverizer; and mechanism for adding air to the combined air and material coming from the pulverizer and impelling the same towards the point of combustion, said mechanism having a greater capacity and effecting a lower pressure than the means.

29. In an apparatus for treating and feeding fuel, the combination of a pulverizer comprising a chamber having an attrition surface; beaters operating in connection with said surface; means for delivering air under pressure to act on the material to advance the material through the pulverizer; and mechanism for adding air to the combined air and material coming from the pulverizer and impelling the same towards the point of combustion, said means being proportioned to the mechanism to deliver the material to the mechanism at a pressure approximating the pressure of the supplemental air delivered to the mechanism.

30. In apparatus for treating and feeding fuel, the combination of a pulverizer comprising a chamber having an annular attrition surface; beaters operating in connection with said surface; means comprising annular axially extending walls for confining the material to a restricted space adjacent to the attrition surface; devices for delivering air under pressure to said space to advance the material; and mechanism adding air to the combined air and material coming from the pulverizer and impelling the same towards the point of combustion.

31. In an apparatus for treating and feeding fuel, the combination of a pulverizer comprising a chamber having an annular attrition surface; beaters operating in connection with said surface; means comprising annular axially extending walls for confining the material to a restricted space adjacent to the attrition surface; devices for delivering air under pressure to said space to advance the material; and mechanism adding air to the combined air and material coming from the pulverizer and impelling the same towards the point of combustion, the devices effecting a higher pressure than the mechanism.

32. In an apparatus for treating and feeding fuel, the combination of a pulverizer comprising a chamber having an annular attrition surface; beaters operating in connection with said surface; means comprising annular axially extending walls for confining the material to a restricted space adjacent to the attrition surface; devices for delivering air under pressure to said space to advance the material; and mechanism adding air to the combined air and material coming from the pulverizer and impelling the same towards the point of combustion, the devices having a less capacity but effecting a higher pressure than the mechanism.

33. In an apparatus for treating and feeding fuel, the combination of a pulverizer comprising a chamber having an annular attrition surface; beaters operating in connection with said surface, said beaters being inclined to advance the air and material; means comprising annular axially extending walls for confining the material to a restricted space adjacent to the attrition surface; devices for delivering air under pressure to said space to advance the material; and mechanism adding air to the combined air and material coming from the pulverizer and impelling the same towards the point of combustion, the devices having a less capacity but effecting a higher pressure than the mechanism.

34. In an apparatus for treating and feeding fuel, the combination of a pulverizer comprising a chamber having an annular attrition surface, rotary beaters operating in connection with said attrition surface; means comprising annular axially extending walls for confining the material adjacent to the attrition surface; a fan carried with the beaters at the inlet to the pulverizer; and a fan carried with the beaters at the outlet of the pulverizer for advancing material and supplying air for combustion.

35. In an apparatus for treating and feeding fuel, the combination of a pulverizer comprising a chamber having an annular attrition surface, rotary beaters operating in connection with said attrition surface; means comprising annular axially extending walls for confining the material adjacent to the attrition surface; a fan carried with the beaters at the inlet to the pulverizer; and a fan carried with the beaters at the outlet of the pulverizer for advancing material and supplying air for combustion, the fan at the inlet being adapted to exert a higher pressure than the fan at the outlet.

36. In an apparatus for treating and feeding fuel, the combination of a pulverizer comprising a chamber having an annular attrition surface; rotary beaters operating in connection with said attrition surface the beaters being inclined to advance the material and air; means comprising annular axially extending walls for confining the material adjacent to the attrition surface; a fan carried with the beaters at the inlet to the pulverizer; and a fan carried with the beaters at the outlet of the pulverizer for advancing material and supplying air for combustion.

37. The method of treating and feeding fuel which consists in passing the same through a pulverizer; driving the same with air under pressure; and receiving and advancing the same with added air impelled with an added impulse under a lesser pressure.

38. The method of treating and feeding fuel which consists in passing the same through a pulverizer; driving the same with air under pressure; and receiving and advancing the same after it leaves the pulverizer with added air impelled with an added impulse under a lesser pressure, the added air being in excess of the air used in moving the material through the pulverizer.

39. In an apparatus for treating and feeding fuel the combination of a pulverizer comprising a chamber having an attrition surface; beaters operating in connection therewith; means for effecting a flow of air through the pulverizer to act on the material and to advance the material through the pulverizer; and mechanism for adding air to the combined air and material after it leaves the pulverizer for impelling the same towards the point of combustion.

40. In an apparatus for treating and feeding fuel the combination of a pulverizer comprising a chamber having an attrition surface; beaters operating in connection therewith; means for effecting a flow of air through the pulverizer to act on the material to advance the material and through the pulverizer; and mechanism for adding air to the combined air and material for impelling the same towards the point of combustion, said mechanism effecting a lower pressure than the means.

41. In an apparatus for treating and feeding fuel, the combination of a pulverizer comprising a chamber having an attrition surface; beaters operating in connection therewith; means for effecting a flow of air through the pulverizer to act on the material to advance the material through the pulverizer; and mechanism for adding air to the combined air and material and for impelling the same towards the point of combustion, said mechanism having a greater capacity than the means, 42. In an apparatus for treating and feeding fuel, the combination of a pulverizer comprising a chamber having an attrition surface; beaters operating in connection therewith; means for effecting a flow of air through the pulverizer to act on the material to advance the material through the pulverizer; and mechanism for adding air to the combined air and material and for impelling the same towards the point of combustion, said mechanism having a greater capacity but effecting a lower pressure than the means.

43. The method of treating and feeding fuel which consists in passing the same through a pulverizer; driving the same through the pulverizer by the action of air; and receiving and advancing the same after it leaves the pulverizer with added air impelled with an added impulse, the added air being in excess of the air used in moving the material through the pulverizer.

In testimony whereof I have hereunto set my hand.

PAUL A. HIRSCH.